US010097369B2

(12) United States Patent
Liverance et al.

(10) Patent No.: US 10,097,369 B2
(45) Date of Patent: Oct. 9, 2018

(54) ATTACHED COMPUTING DEVICE (71) Applicant: Hewlett-Packard Development Company, L.P., Houston, TX (US)

(72) Inventors: Fletcher Liverance, Kent, OH (US); Thomas J Flynn, Magnolia, TX (US)

(73) Assignee: Hewlett-Packard Development Company, L.P., Houston, TX (US)

(*) Notice: Subject to any disclaimer, the term of this patent is extended or adjusted under 35 U.S.C. 154(b) by 136 days.

(21) Appl. No.: 14/787,952

(22) PCT Filed: Jun. 28, 2013

(86) PCT No.: PCT/US2013/048718
§ 371 (c)(1),
(2) Date: Oct. 29, 2015

(87) PCT Pub. No.: WO2014/209386
PCT Pub. Date: Dec. 31, 2014

(65) Prior Publication Data
US 2016/0080167 A1 Mar. 17, 2016

(51) Int. Cl.
*H04L 12/40* (2006.01)
*H04L 29/08* (2006.01)
(Continued)

(52) U.S. Cl.
CPC ............ *H04L 12/40* (2013.01); *G06F 8/61* (2013.01); *G06F 9/4411* (2013.01); *G06F 13/385* (2013.01); *H04L 67/025* (2013.01)

(58) Field of Classification Search
CPC ..... H04L 12/40; H04L 67/025; G06F 13/385; G06F 9/4411; G06F 8/61
See application file for complete search history.

(56) References Cited

U.S. PATENT DOCUMENTS 7,213,096 B2   5/2007  Keys et al.
7,890,724 B2   2/2011  LaPedis et al.
(Continued)

FOREIGN PATENT DOCUMENTS

CN        102480724 A    5/2012
CN        103168475 A    6/2013
KR   10-2008-0065712     7/2008

OTHER PUBLICATIONS

Caceres, R. et al.; "Reincarnating PCs with Portable SoulPads";—MobiSys '05—Jun. 2005; 14 pages.
(Continued)

*Primary Examiner* — Kim T Nguyen
(74) *Attorney, Agent, or Firm* — Trop, Pruner & Hu PC (57) ABSTRACT Examples of a computing device for attaching to a host computing device are disclosed. In one example implementation according to aspects of the present disclosure, a computing device may include one or more processors, a memory, and a connection port to attach the computing device to a host computing device. Additionally, the computing device may include a driver installation module to cause a device driver to be installed on the host computing device to enable the computing device to send data to and receive data from the host computing device. The computing device may also include an operating system session module to initiate an operating system session on the computing device and to cause the operating system session to be accessible to a user of the host computing device via a web browser interface on the host computing device.

20 Claims, 3 Drawing Sheets (51) Int. Cl.
*G06F 13/38* (2006.01)
*G06F 8/61* (2018.01)
*G06F 9/4401* (2018.01)

(56) References Cited

U.S. PATENT DOCUMENTS

| | | | |
|---|---|---|---|
| 8,341,087 B2 | 12/2012 | Lee | |
| 8,392,539 B1 | 3/2013 | Chen et al. | |
| 8,438,287 B2 | 5/2013 | Liu et al. | |
| 2007/0113267 A1* | 5/2007 | Iwanski | G06F 21/32 726/2 |
| 2009/0119365 A1* | 5/2009 | Tomic | G06F 3/1462 709/203 |
| 2011/0119600 A1 | 5/2011 | Liu et al. | |
| 2011/0276619 A1 | 11/2011 | Khan et al. | |
| 2012/0047277 A1* | 2/2012 | Keidar | H04N 5/50 709/230 |
| 2012/0084545 A1 | 4/2012 | Farina et al. | |
| 2012/0158822 A1 | 6/2012 | Dai et al. | |
| 2012/0246359 A1 | 9/2012 | Scragg et al. | |
| 2013/0013815 A1 | 1/2013 | Desai et al. | |

OTHER PUBLICATIONS

PCT Search Report/Written Opinion~Application No. PCT/US2013/048718~dated Mar. 27, 2014; 11 pages.

European Patent Office, Extended European Search Report for Appl. No. 13887690.9 dated Jan. 24, 2017 (8 pages).

* cited by examiner

ATTACHED COMPUTING DEVICE

BACKGROUND

Users of computer systems may desire to use their own device on another's network, such as an employer's network. For example, a user may wish to use his own computing device, such as a laptop, tablet, etc., to connect securely to his employer's network, either at work or from a remote location.

BRIEF DESCRIPTION OF THE DRAWINGS

The following detailed description references the drawings, in which.

DETAILED DESCRIPTION

Employers sometimes allow employees to bring their own computing devices into the work place or allow users to use their own computing devices from remote locations (e.g., from home, from a mobile device, from a public computing device) to access the employer's network. These "bring your own devices" programs result in many different types of devices being used in the same network. Additionally, users' own devices may contain viruses or other damaging software that may be harmful to the employer's network. Similarly, if a user's device does not contain property security protections, the employer's network may be improperly accessed or "hacked" through the user's device.

Previously, an employer may require a user to dual boot the user's own device with one operating system being the user's own operating system, and one operating system being the employer's operating system. Similarly, a user may have been required to use a bootable USB memory device (or similar memory device) to boot the user's own computing device using an operating system stored on the USB memory device. One downside of this solution is that it prevents the user from accessing the user's own operating system while using the employer's operating system. Another downside of this solution is that the operating system on the USB memory device must contain all the necessary drivers and software for the computing device to function properly.

Another prior method is to allow an employee to remotely connect to the employer's network. For example, a virtual private network, a remote desktop protocol session, a Citrix remote session, or other remote session may enable the employee to connect its device to the employer's network. In this case, the user may access content on the employer's network through a web browser, through client software, or through another similarly appropriate method. However, this method passes all communications over the user's network before reaching the employer's network. This not only introduces issues of latency but also internet security. Another drawback to the client software often used to access the remote network is that it must be written for many different operating systems because the users' devices often vary in this respect.

Various examples will be described below by referring to several examples of an attached computing device for attaching to a host computing device, the attached computing device enabling a user to access a dedicated computing environment on the attached computing device via the host computing device. In one example, a user may attach the attached computing device to the host computing device. Once attached, the attached computing device may boot up and load an operating system on the attached computing device. The user may then access the operating system on the attached computing device through the host computer through a web browser, for example.

In some implementations, the user can run a completely separate operating system environment on the attached computing device from a variety of standard operating systems (e.g., Microsoft Windows, Apple iOS, Android OS, Linux, etc.) on the host computing device without having to install any additional software on the host computing device. The attached computing device also provides for secure access through the host computing device by using, for example, an encrypted and/or authenticated browser session to allow the user to access confidential or secure resources from the attached computing device without the typical security risks associated with these types of combined consumer and corporate environments. Moreover, the attached computing device provides portability, allowing a user to transport the attached computing device and use it in a variety of host computing devices. This allows a user (employee) to access the employer's network and data from almost anywhere, without needing administrative access to or having to perform extensive management activities on the host computing device. These and other advantages will be apparent from the description that follows.

Figure 1:
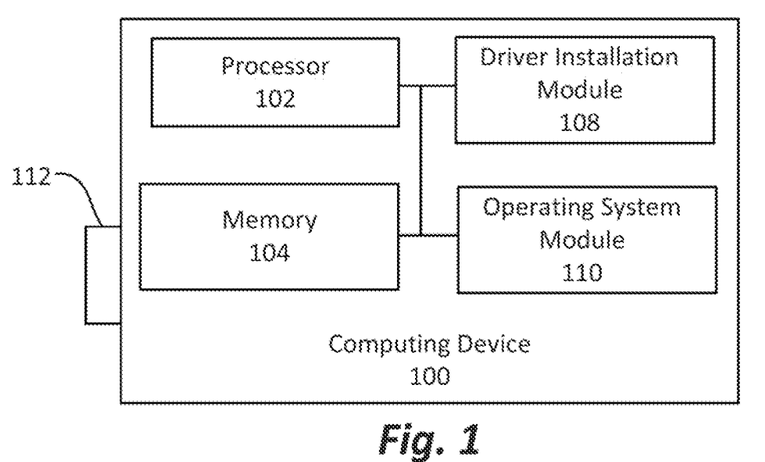
FIG. 1 illustrates a block diagram of a computing device for attaching to a host computing device according to examples of the present disclosure.

FIG. 1 illustrates a block diagram of a computing device 100 for attaching to a host computing device (not shown) according to examples of the present disclosure. It should be understood that the host computing device may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like.

The computing device 100, which may also be referred to herein as an attached computing device or attached device, may include a processor 102 that may be configured to process instructions. The processor 102 may be any appropriate type of processor or microprocessor, including an ARM processor or other type of RISC-based processor, or the processor 102 may include a general purpose processor or specialized processor.

The Instructions may be stored on a non-transitory tangible computer-readable storage medium, such as memory device 104, or on a separate device (not shown), or on any other type of volatile or non-volatile memory that stores instructions to cause a programmable processor to perform the techniques described herein. Alternatively or additionally, the computing device 100 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

The computing device 100 may be attached to the host computing device in a variety of ways. For example, the computing device 100 may include a connection port 112, such as a USB port, Firewire port, Ethernet port, serial port, or another suitable type of connection port for connecting the computing device 100 to the host computing device via a similarly suited type of port (not shown) on the host computing device. If the connection port 112 of the computing device 100 is a USB connection port, for example, the computing device 100 may attach to the host computing device at a USB receiving port of the host computing device (not shown).

The computing device 100 may include a driver installation module 108 in one example. The driver installation module 108 may be stored in the memory 104 and executing on the processor 102 and may cause a device driver to be installed on the host computing device. In one example, the device driver may be stored in the memory 104 or, in another example, may be stored in a data store such as data store 206 or data store 306 of FIGS. 2 and 3 respectively. Multiple device drivers may be stored in the data store, and the correct device driver may be selected by the driver installation module 108 or by a user of the host computing device.

The device driver may enable the computing device 100 to communicate with the host computing device by sending data to and receiving data from the host computing device. In one example, the computing device 100 may attach to a host computing device via a USB connection at a connection port 112. In this scenario, the device driver may be a USB device driver to enable the computing device 100 to send data to and receive data from the host computer via the USB connection. In other examples, differing suitable connection types may be utilized as appropriate.

The driver installation module 108 may cause the host computing device to install the device driver. For example, if the host computing device is already powered on when the computing device is attached to the host computing device, the computing device may automatically be triggered. In this case, the driver installation module 108 may pass or communicate the device driver to the host computing device, along with a command (or set of commands) to cause the host computing device to install the device driver. The driver installation module 108 may also be triggered manually such as through a physical button press, through a command entered at a command prompt, or through a selection on a user interface.

In one example, the host computing device may prompt a user of the host computing device to allow or accept the device driver installation. The host computing device may also install the device driver without input from the user and/or without the user's knowledge, in another example. Once the device driver is installed on the host computing device, the computing device 100 may communicate with the host computing device by sending data to and receiving data from the host computing device.

The computing device 100 may also include an operating system module 110, which may initiate an operating system session on the computing device 100. For example, the operating system module 110 may cause an operating system (e.g., Linux, Microsoft Windows, Android OS, Apple iOS, etc.) to boot up and initiate on the computing device 100. This may include loading the relevant operating system software and/or drivers necessary to initiate the operating system session on the computing device 100. The operating system session may be loaded into the memory 104 and may be executed on the processor 102. The operating system module 108 may begin initiating the operating system upon the computing device 100 being attached to the host computing device (if the host computing device is already powered on) or may begin once the host computing device is turned on (if the computing device 100 is already attached to the host computing device).

In one example, the operating system module 110 may wait for the driver installation module to install the appropriate device driver on the host computing device before attempting to initiate the operating system. In another example, the operating system module 110 may initiate the operating system concurrently with the driver installation module while the driver installation module installs the appropriate device driver on the host computing device.

Once the operating system is initiated, the computing device 100 may cause the host computing device to launch a web browser interface on the host computing device's user interface. A user may also manually launch the web browser interface on the host computing device via its user interface. The web browser interface may connect to the computing device 100 via a communications link established between the computing device 100 and the host computing device, for example, via connection port 112. In an example where the computing device is attached to the host computing device by a USB type connection, the communications link may be a USB communications link. In other example, other types of communications links may be utilized, including Firewire, Ethernet, serial, or any other appropriate type of communications link.

The computing device 100 and the host computing device may communicate over the communications link using a variety of application layer communication types. For example, the devices may communicate using hypertext transfer protocol (unsecured or secured). In this example, the computing device 100 may communicate with the host computing device by sending an interactive graphical user interface to the web browser of the host computing device using a standard markup language such as hypertext markup language (HTML) version 5, as one example. This may include sending HTML5 video of varying decode types, such as H.264, VP8, MPEG4, and the like. The host computing device may decode the HTML5 using the web browser.

The interactive graphical user interface may then be displayed in the web browser of the host computing device and presented to the user. The user may interact with the user interface by making selections with a mouse or entering text or commands with a keyboard. For example, the user may launch any software contained on the computing device 100 through the web browser on the host computing device. In this case, the application launched may run within the web browser window on the host computing device, meaning that the host computing device will be fully isolated from the application running on the computing device 100 other than merely displaying the application in the web browser.

Figure 2:
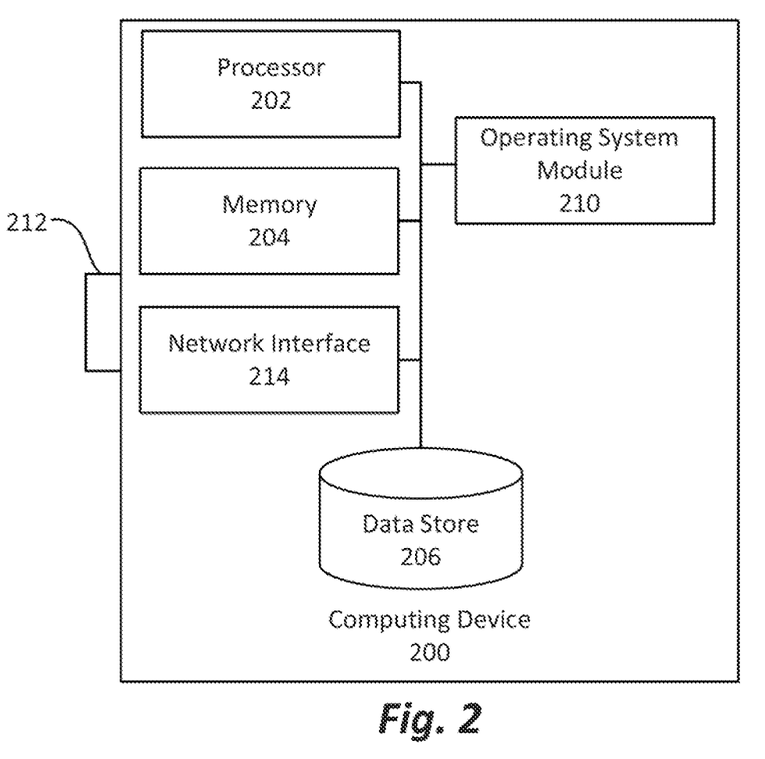
FIG. 2 illustrates a block diagram of a computing device for attaching to a host computing device according to examples of the present disclosure.

FIG. 2 illustrates a block diagram of a computing device 200 for attaching to a host computing device (not shown) according to examples of the present disclosure. In the example shown in FIG. 2, the computing device 200 may include a network interface 214 and a data store 206 in addition to a processor 202, a memory 204, and an operating system module 210, such as the corresponding aspects of FIG. 1. The components shown in FIG. 1 may be present in some variety in FIG. 2.

In some examples, such as shown in FIG. 2, a data store 206 may be included in the computing device 200, which may be used to store data. The data may include, for example the operating system, a device driver or drivers, and/or other appropriate data. The data store 206 may be a hard disk drive, a flash memory device, a read-only memory device, a random access memory device, or another suitable device for storing data. The data store 206 may also store applications or programs which may be launched and used by a user of the host computing device on the computing device 200. Multiple data stores (of the same or different types) may be utilized in other examples.

A network interface 214 may also be included in the computing device 200. The network interface 214 may be any suitable type of network interface card such as wireless or wired network interface card. For example, the network interface 214 may be a wireless network card configured to operate under the 802.11 standard using radio frequencies. The network interface 214 may also be a wired network interface card configured to connect via a wire to a network, such as through an Ethernet connection. A variety of other network interfaces may be used in differing examples, including Bluetooth, WLAN, near field communications, RF, or any other suitable type of wired or wireless network interfaces.

The network interface 214 enables the computing device to receive and send network data without using any network connection that may be present on the host computing device. In this way, the computing device maintains a secure and isolated environment from the host computing device.

Figure 3:
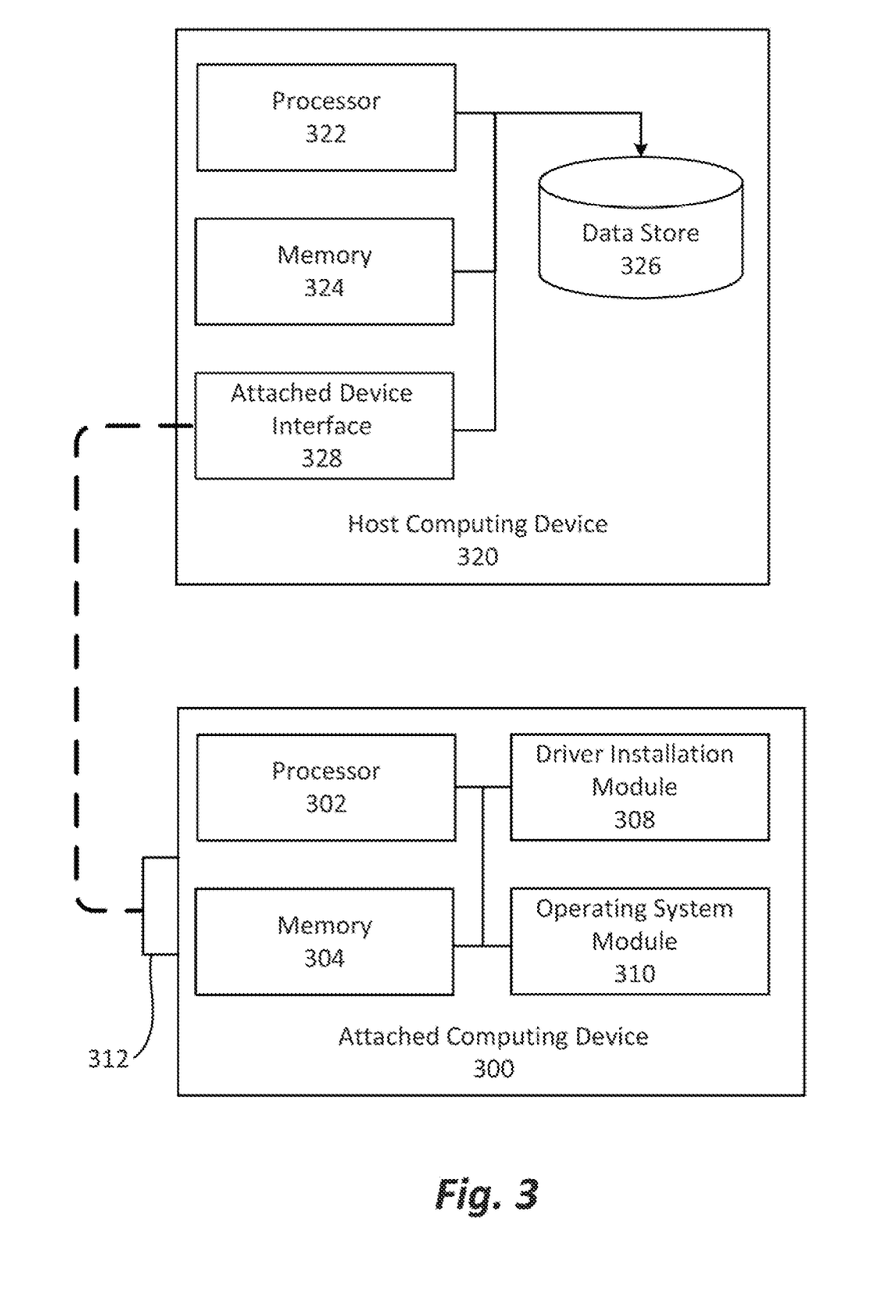
FIG. 3 illustrates a block diagram of an attached computing device attached to a host computing device according to examples of the present disclosure.

FIG. 3 illustrates a block diagram of an attached computing device 300 attached to a host computing device 320 according to examples of the present disclosure. The attached computing device 300 may include a processor 302, a memory 304, a driver installation module 308, and an operating system module 310, such as those described herein regarding FIGS. 1 and 2. Of course, the attached computing device 300 may include additional components and/or modules, as described herein, and the attached computing device 300 shown in FIG. 3 is only one example.

The computing device 200 illustrated in FIG. 2 may be configured to process instructions on the processor 202, and the instructions may be stored on a non-transitory tangible computer-readable storage medium, such as the memory 204, or on a separate device (not shown), or on any other type of volatile or non-volatile memory that stores instructions to cause a programmable processor to perform the techniques described. For example, the instructions may cause the processor 202 to perform at least the following functions: initiate an operating system session on a computing device 200 attached to a host computing device; encode an interactive remote display to be displayed in a browser of the host computing device; and transmit the encoded interactive remote display to the host computer via the communications link.

In one example, the instructions may also cause the processor 200 to cause the host computing device to install a driver from the computing device 200 to enable the computing device 200 and the host computing device to communicate via a communications link. In another example, the host computing device may utilize an existing standard driver, such as a standard USB driver, and may not install a new driver from the computing device 200. In this example, the host computing device may launch a browser session directly to the computing device 200 to access the operating system session via the web browser.

The host computing device 320 may include a processor 322, a memory 324, a data store 326 and an attached device interface 328. It should be understood that the host computing device may include any appropriate type of computing device, including for example smartphones, tablets, desktops, laptops, workstations, servers, smart monitors, smart televisions, digital signage, scientific instruments, retail point of sale devices, video walls, imaging devices, peripherals, or the like.

The host computing device 320 may include a processor 322 that may be configured to process instructions. The processor 322 may be any appropriate type of processor or microprocessor, including an ARM processor or other type of RISC-based processor, or the processor 322 may include a general purpose processor or specialized processor.

The instructions may be stored on a non-transitory tangible computer-readable storage medium, such as memory device 324, or on a separate device (not shown), or on any other type of volatile or non-volatile memory that stores instructions to cause a programmable processor to perform the techniques described herein. Alternatively or additionally, the computing device 320 may include dedicated hardware, such as one or more integrated circuits, Application Specific Integrated Circuits (ASICs), Application Specific Special Processors (ASSPs), Field Programmable Gate Arrays (FPGAs), or any combination of the foregoing examples of dedicated hardware, for performing the techniques described herein. In some implementations, multiple processors may be used, as appropriate, along with multiple memories and/or types of memory.

Although not shown, the host computing device 320 may also include input and output methods such as a keyboard and/or mouse and a monitor or other display for receiving user input and for displaying to the user information from the host computing device 320 and from the attached computing device 300 (via a web browser on the host computing device 320).

The host computing device 320 may include a data store 326 in some examples, which may be used to store data. The data may include, for example an operating system, a device driver or drivers such as those installed by the driver installation module 308 of the attached computing device 300, and/or other appropriate data. The data store may be a hard disk drive, a flash memory device, a read-only memory device, a random access memory device, or another suitable device for storing data.

The attached computing device 300 may also include a connection port 312, which may support one or more of a variety of suitable connection types including USB, Firewire, serial, Ethernet, etc. The connection port 312 enables the attached computing device to be communicatively coupled and attached to the host computing device 320, either directly or indirectly, such as through a cable or wireless connection.

The dotted line shown in FIG. 3 depicts the connection between the attached computing device 300 and the host computing device 320. The connection port 312 may plug into the attached device interface 328, for example. If the connection port 312 of the attached computing device 300 is a USB type connection port, the attached device interface 328 of the host computing device 320 may be of a suitable USB type receiving port for accepting the attached computing device 320. Of course, the attached device interface 328 may be of many different types suitable to receive connection port 312. Additional attached device interfaces may be present in the host computing device 320 to enable multiple attached computing devices (or multiple attached computing device types) to be connected to the host computing device 320.

Figure 4:
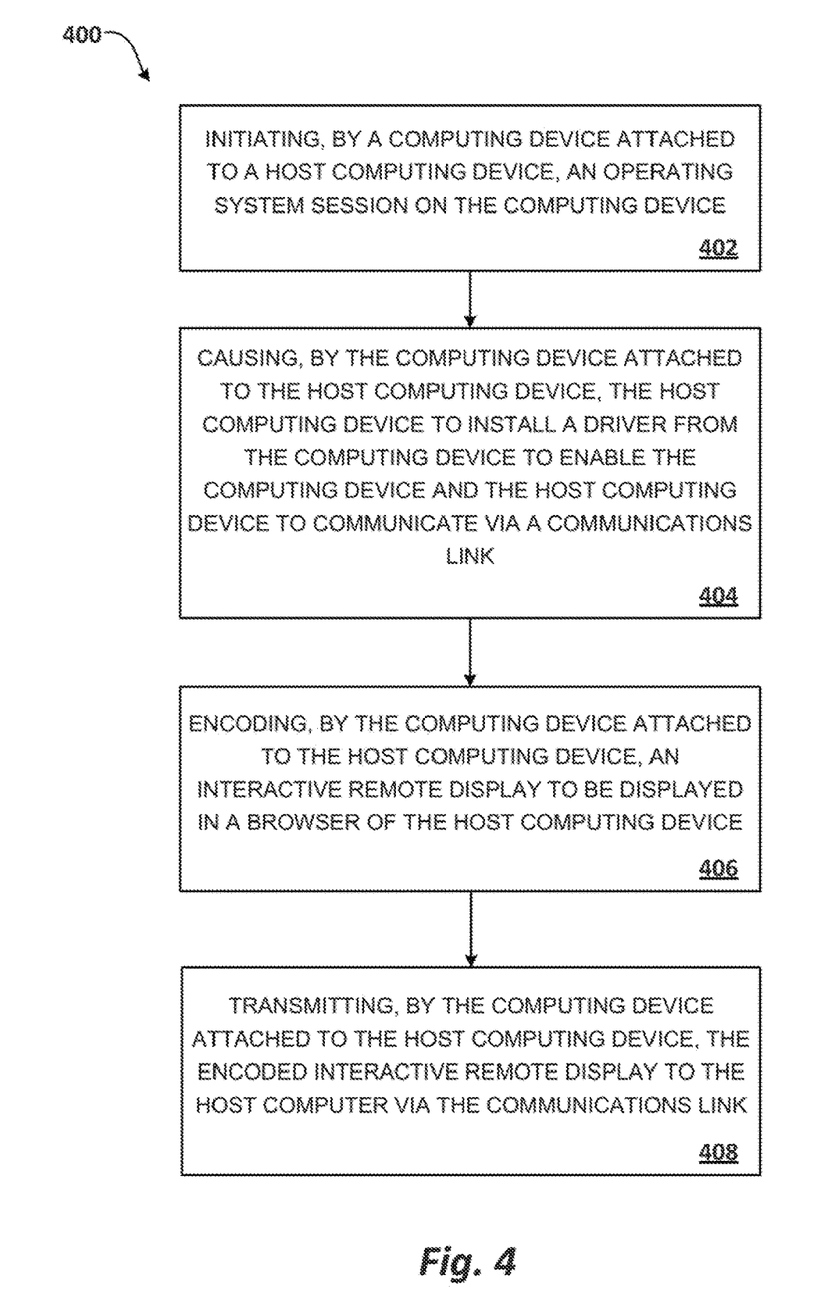
FIG. 4 illustrates a flow diagram of a method for an attached computing device communicating with a host computing device according to examples of the present disclosure.

FIG. 4 illustrates a flow diagram of a method 400 for an attached computing device communicating with a host computing device according to examples of the present disclosure. The method may be performed, for example, by the computing devices 100, 200, and/or 300 shown in FIGS. 1-3 respectively, or by another similarly suited device.

The method 400 may include at least: causing, by the computing device attached to the host computing device, the host computing device to install a driver from the computing device to enable the computing device and the host computing device to communicate via a communications (block 402); link initiating, by a computing device attached to a host computing device, an operating system session on the computing device (block 404); encoding, by the computing device attached to the host computing device, an interactive remote display to be displayed in a browser of the host computing device (block 406); and transmitting, by the computing device attached to the host computing device, the encoded interactive remote display to the host computing device via the communications link (block 408).

In the example shown, at block 402, the method 400 may include causing, by the computing device attached to the host computing device, the host computing device to install a driver from the computing device to enable the computing device and the host computing device to communicate via a communications link. The initiating may be triggered automatically, such as when the computing device is first attached to the host computing device (if the host computing device is already powered on or when the host computing device is first powered on (if the computing device is already attached). The initiating may also be triggered manually such as by a button press, a key selection, the entering of a command, or the selection of the initiating from a menu displayed on a user interface of the host computing device. In one example, the initiating may include determining whether the driver has previously been installed in the host computing device and, if so, updating the driver (if required). If the driver has been previously installed and the driver is up-to-date, no driver installation may be necessary on the host computing device.

The driver may be a device driver of a type suitable to the type of communications link and connection port between the computing device and the host computing device, as described herein. For example, if the computing device attached to the host computing device communicates with the host computing device via a USB communications link, the driver may be a USB device driver. The communications link, such as a USB communications link may be capable of transmitting and receiving data via a hypertext transfer protocol. The flow may then continue to block 404.

At block 404, the method 400 may include initiating, by a computing device attached to a host computing device, an operating system session on the computing device. Once the driver is installed on the host computing device, the computing device attached to the host computing device may initiate an operating system session on the computing device. This may include loading the appropriate software code into the computing device's memory to be executed by the computing device's processor. The operating system may be of any suitable type, such as Microsoft Windows, Apple iOS, Android OS, Linux, etc. The flow may then continue to block 406.

At block 406, the method 400 may include encoding, by the computing device attached to the host computing device, an interactive remote display to be displayed in a browser of the host computing device. Once the operating system session has initiated and is booted up, the computing device may encode an interactive remote display representative of the operating system session. In one example, the encoding may include encoding the interactive remote display via HTML5 or another suitable encoding method. This may include encoding HTML5 video of varying types, such as H.264, VP8, MPEG4, and the like. The encoded interactive remote display provides a secure way for the computing device to transmit the its output display to the host computing device. The flow may then continue to block 408.

At block 408, the method 400 may include transmitting, by the computing device attached to the host computing device, the encoded interactive remote display to the host computing device via the communications link. Once the interactive remote display is properly encoded, the interactive remote display may be transmitted to the host computing device, such as over the communications link. In an example where the computing device is attached to the host computing device via a USB connection, the transmitting may occur via the USB connection using a USB communications link.

When the host computing device receives the encoded interactive remote display, it may decode the encoded interactive remote display, such as using its web browser, and may display the interactive remote display to a user via the web browser. In one example, the host computing device may decode the HTML5 or other encoding method using the web browser. A standard decode format may be used, such as HTML5, and therefore no special browser plugins may be necessary. In fact, if no driver is installed on the host computing device, there may be no special software installed on the host computing device at all.

Additional processes also may be included, and it should be understood that the processes depicted in FIG. 4 represent generalized illustrations, and that other processes may be added or existing processes may be removed, modified, or rearranged without departing from the scope and spirit of the present disclosure. For example, the method 400 may include receiving, by the computing device attached to the host computing device, an input from a user of the host computing device via the web browser of the host computing device. In this example, the user may launch an application stored on the computing device by interacting with the computing device via the web browser of the host computing device.

Additionally, the method 400 may include decoding commands sent from the host computing device (i.e., an input from a user) to the computing device attached to the host computing device. The commands may be in formats such as H.264, VP8, MPEG4, and the like.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:

1. A method comprising:
causing, by an attached computing device attached to a host computing device, the host computing device to install a driver from the attached computing device to enable the attached computing device and the host computing device to communicate via a communications link;
initiating, by the attached computing device, an operating system session on the attached computing device by initiating an operating system on the attached computing device, the operating system session initiated by initiating the operating system on the attached computing device providing a secure computing environment separate from a computing environment of the host computing device;
after initiating the operating system session by initiating the operating system on the attached computing device, causing, by the attached computing device, the host computing device to launch a browser on the host computing device, the browser on the host computing device to communicate with the attached computing device via the communications link;
encoding, by the attached computing device, an interactive remote display to be displayed in the browser of the host computing device; and
transmitting, by the attached computing device, the encoded interactive remote display to the host computing device via the communications link.

2. The method of claim 1, wherein the communications link is a USB link capable of transmitting and receiving data via a hypertext transfer protocol.

3. The method of claim 2, wherein the driver is a USB driver.

4. The method of claim 1, wherein the encoding includes encoding the interactive remote display via HTML5.

5. The method of claim 1, wherein the encoding includes encoding the interactive remote display using at least one of the following formats selected from the group consisting of: H.264, VP8, and MPEG4.

6. The method of claim 1, further comprising:
receiving, by the attached computing device, an input from a user of the host computing device via the browser of the host computing device.

7. The method of claim 6, further comprising:
decoding, by the attached computing device, the received input from the user of the host computing device.

8. The method of claim 1, further comprising:
interacting, by the attached computing device, with the host computing device based on interaction of a user with the interactive remote display displayed in the browser of the host computing device.

9. The method of claim 8, further comprising:
launching, by the attached computing device, an application contained in the attached computing device on the host computing device in response to the interaction.

10. The method of claim 1, further comprising:
waiting, by the attached computing device, for the installing of the driver on the host computing device before initiating the operating system on the attached computing device.

11. A computing device comprising:
one or more processors;
a memory;
a connection port to attach the computing device to a host computing device;
instructions stored in the memory, the instructions when executed causing at least one of the one or more processors to:
cause a device driver to be installed from the computing device to the host computing device to enable the computing device to send data to and receive data from the host computing device;
initiate an operating system session on the computing device by initiating an operating system on the computing device, the operating system session initiated by initiating the operating system on the computing device providing a secure computing environment on the computing device separate from a computing environment of the host computing device; and
after initiating the operating system session by initiating the operating system on the computing device, cause launching of a web browser on the host computing device, the operating system session accessible to a user of the host computing device via the web browser launched on the host computing device.

12. The computing device of claim 11, further comprising:
a network interface to communicatively couple the computing device to a network.

13. The computing device of claim 11, wherein the connection port is a USB connection port.

14. The computing device of claim 11, wherein the instructions when executed cause at least one of the one or more processors to encode an interactive remote display generated in the operating system session of the computing device.

15. The computing device of claim 14, wherein the instructions when executed cause at least one of the one or more processors to send the encoded interactive remote display to the host computing device to cause display of the interactive remote display on the web browser on the host computing device.

16. The computing device of claim 15, wherein the encoded interactive remote display is encoded using HTML5.

17. The computing device of claim 11, wherein the instructions when executed cause at least one of the one or more processors to wait for the installing of the device driver on the host computing device before initiating the operating system on the computing device.

18. A non-transitory computer-readable storage medium storing instructions that, when executed cause a computing device to:
initiate an operating system session on the computing device attached to a host computing device, the initiating of the operating system session comprising initiating an operating system on the computing device, the operating system session initiated by initiating the operating system on the computing device providing a secure computing environment separate from a computing environment of the host computing device;
after initiating the operating system session by initiating the operating system on the computing device, cause the host computing device to launch a browser on the host computing device, the browser on the host computing device to communicate with the computing device via a communications link;
encode an interactive remote display to be displayed in the browser launched on the host computing device; and transmit the encoded interactive remote display to the host computing device via the communications link.

19. The non-transitory computer-readable storage medium of claim 18, wherein the instructions further cause the processor to:
cause the host computing device to install a driver from the computing device to enable the computing device and the host computing device to communicate via the communications link.

20. The non-transitory computer-readable storage medium of claim 19, wherein the instructions when executed cause the computing device to:
interact with the host computing device based on interaction of a user with the interactive remote display displayed in the browser of the host computing device; and
launch an application contained in the computing device on the host computing device in response to the interaction.

* * * * *